(12) United States Patent
Seaton et al.

(10) Patent No.: US 9,097,734 B2
(45) Date of Patent: Aug. 4, 2015

(54) CERAMIC HEATING DEVICE

(75) Inventors: John David Seaton, Blackborough (GB); Peter Leonard Wise, Taunton (GB); Christopher Martin Morter, Culmstock (GB); Michael John Roberts, Taunton (GB)

(73) Assignee: Amphenol Thermometrics, Inc., St. Marys, PA (US)

( * ) Notice: Subject to any disclaimer, the term of this patent is extended or adjusted under 35 U.S.C. 154(b) by 570 days.

(21) Appl. No.: 13/343,116

(22) Filed: Jan. 4, 2012

(65) Prior Publication Data
US 2013/0168383 A1 Jul. 4, 2013

(51) Int. Cl.
*H05B 3/02* (2006.01)
*G01P 5/165* (2006.01)
*G01P 13/02* (2006.01)

(52) U.S. Cl.
CPC .............. *G01P 5/165* (2013.01); *G01P 13/025* (2013.01)

(58) Field of Classification Search
CPC ....... G01P 13/025; G01P 5/165; G01P 13/02; H05B 3/02
See application file for complete search history.

(56) References Cited

U.S. PATENT DOCUMENTS

| | | | | |
|---|---|---|---|---|
| 4,121,088 A | * | 10/1978 | Doremus et al. | 219/201 |
| 6,070,475 A | * | 6/2000 | Muehlhauser et al. | 73/861.68 |
| 6,849,829 B1 | | 2/2005 | Otterbach | |
| 6,918,294 B1 | * | 7/2005 | Roberge | 73/170.02 |
| 2010/0116806 A1 | | 5/2010 | Hollingsworth et al. | |

FOREIGN PATENT DOCUMENTS

| | | |
|---|---|---|
| EP | 0100715 A1 | 2/1984 |
| WO | 2009085311 A1 | 7/2009 |

OTHER PUBLICATIONS

Search Report and Written Opinion from EP Application No. 12199342.2 dated Apr. 11, 2013.

* cited by examiner

*Primary Examiner* — Shawntina Fuqua
(74) *Attorney, Agent, or Firm* — Blank Rome LLP

(57) ABSTRACT

Ceramic heating devices with a three-dimensional ceramic element are disclosed for protecting surfaces from icing. The shape of the three-dimensional ceramic element can be configured to physically match to the three-dimensional profile of the protected surface, allowing for high thermal coupling with the surface. The shape of the three-dimensional ceramic element can also be configured to form an aerodynamic surface typically found on the exterior of aircraft.

19 Claims, 3 Drawing Sheets

CERAMIC HEATING DEVICE

BACKGROUND OF THE INVENTION

The subject matter disclosed herein relates to ceramic heating devices.

Modern day aircraft utilize a number of sensors to aid in flight, including air speed sensors, angle of attack sensors, and bulbous wing tip sensors. These sensors are critical to provide flight information to the pilot. A number of these sensors are located externally on the aircraft surface and therefore are subjected to abrasive conditions and extreme temperatures. One problem with external sensors is their susceptibility to icing, which can prevent the sensor from providing accurate data or any data at all.

Wire wound heating devices are used to prevent icing of surfaces of external aircraft sensors by placing the heating devices in or on the sensors. Since the heat produced by the wire wound heating device is directly related to the resistance of the wire and the typically constant voltage applied, the wire wound heating device has a constant current output designed to provide sufficient heat to prevent icing in conditions during flight. But when the icing conditions are not present, the wire wound heating device can reach extremely high temperatures, reducing the reliability and life span of the heating device and jeopardizing the performance of the sensor that is to be protected by the heating device. For example, a wire wound heating device may reach temperatures as high as 300° C. when an aircraft is taxiing on the ground and there are no icing conditions. This results in the wire wound heating device experiencing a much higher temperature when the aircraft is grounded compared to when in flight, subjecting the heating device to severe thermal cycling that can increase the risk of failure.

Ceramic heating devices have also been used to prevent icing of surfaces of external aircraft sensors. Ceramic heating devices are conventionally fabricated using pressing operations to produce flat, planar heating devices which can be used to make shapes that are basically two-dimensional forms. U.S. Patent Application Publication No. US2010/0116806 A1 relates to utilizing ceramic heating devices within a pitot tube air speed sensor design using flat-faced, pellet heating devices in a radial arrangement along the surface of the body of the sensor. Consequently, the array of two-dimensional ceramic heating devices is not continuous or closely matched to the internal surface profile of the surface of the sensor. The multi-component design adds complexity and cost while reducing the efficiency of heat transfer to the surface of the sensor.

The discussion above is merely provided for general background information and is not intended to be used as an aid in determining the scope of the claimed subject matter.

BRIEF DESCRIPTION OF THE INVENTION

Ceramic heating devices with a three-dimensional ceramic element are disclosed for protecting surfaces from icing. The shape of the three-dimensional ceramic element can be configured to physically match to the three-dimensional profile of the protected surface, allowing for high thermal coupling with the surface. The shape of the three-dimensional ceramic element can also be configured to form an aerodynamic surface typically found on the exterior of the aircraft. An advantage that may be realized in the practice of some disclosed embodiments of the ceramic heating device is that the device can be formed to match the profile of the surface protected from icing for improved aerodynamics, heat transfer and de-icing performance.

In one exemplary embodiment, a heating device is disclosed. The heating device comprises a ceramic element, wherein the ceramic element comprises a tip, a base, and an outer surface extending from the tip to the base and defining a non-planar three-dimensional shape.

In another exemplary embodiment, the heating device comprises a ceramic element, wherein the ceramic element comprises a tip, a base, and an outer surface extending from the tip to the base and defining a non-planar three-dimensional shape, an opening proximate to the base, the opening terminating within the ceramic element defining a hollow inner surface of the ceramic element, a first electrode attached to the outer surface of the ceramic element, a second electrode attached to the hollow inner surface of the ceramic element, and a sensor disposed proximate to the outer surface of the ceramic element.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Ceramic heating devices with a three-dimensional ceramic element are disclosed for protecting surfaces from icing. The shape of the three-dimensional ceramic element can be configured to physically match to the three-dimensional profile of the protected surface, allowing for high thermal coupling with the surface. The shape of the three-dimensional ceramic element can also be configured to form an aerodynamic surface typically found on the exterior of aircraft, potentially eliminating the need for a separate aerodynamic housing around the heating device.

Figure 1:
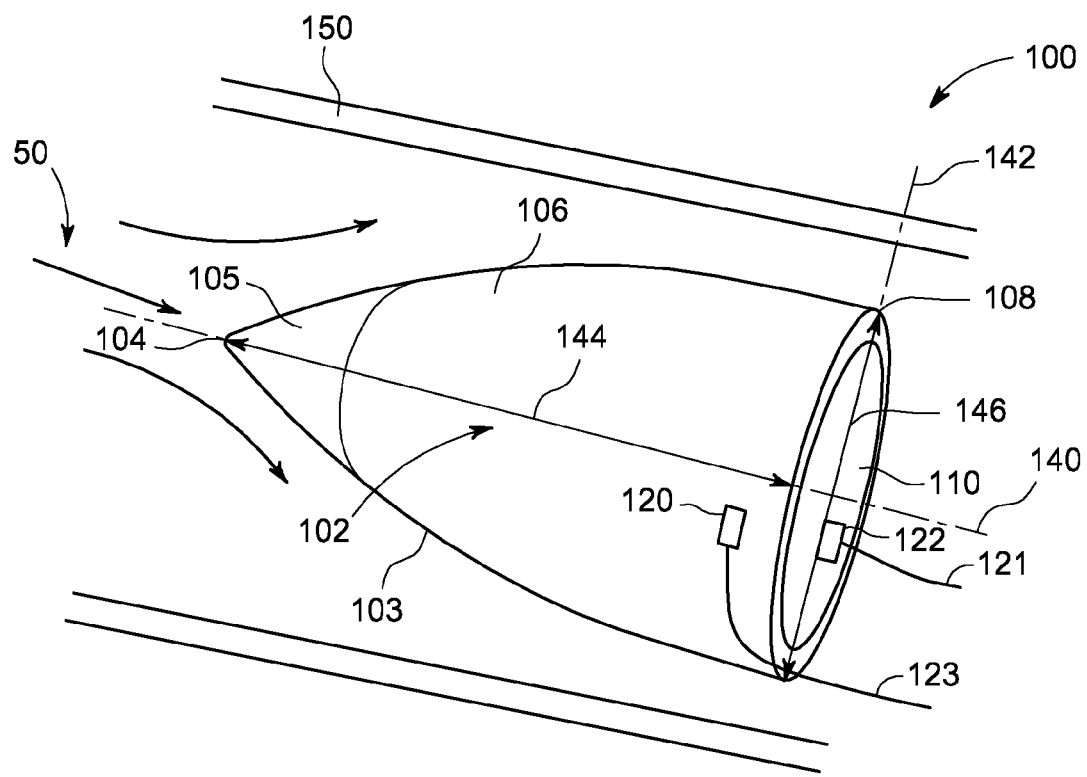
FIG. 1 is an isometric view of an exemplary ceramic heating device proximate to a surface of an airspeed sensor.

FIG. 1 is an isometric view of an exemplary ceramic heating device 100 proximate to a surface 150 of an airspeed sensor. In one embodiment, the ceramic heating device 100 can be positioned in the air flow 50 impinging upon the surface 150 that the heating device 100 is protecting from icing. The ceramic heating device 100 comprises a three-dimensional ceramic element 102. In one embodiment, the three-dimensional ceramic element 102 can have a protective coating 103 on the outer surface 106 to protect the ceramic element 102 from abrasion. In one embodiment, the protective coating 103 is a metal or alloy coating. Since the three-dimensional ceramic element 102 can be configured in an aerodynamic shape, it is not necessary to provide a separate housing to provide the required aerodynamic shape.

The three-dimensional ceramic element 102 can have a tip 104 on a first end forming a tip section 105, and a base 108 on a second end, opposite of the first end. An outer surface 106 extends from the tip 104 to the base 108. In one embodiment, the outer surface 106 can have a conical shape, while in other embodiments, the outer surface 106 can have a different shape. The three-dimensional shape is a non-planar shape having a length 144 in a first plane having an axis 140 parallel to the first plane and a diameter 146 in a second plane having an axis 142 orthogonal to the axis 140 of the first plane, wherein the diameter 146 varies along the length 144 from the tip 104 to the base 108. For aircraft applications, the outer surface 106 would typically have an aerodynamic shape.

The base 108 can have an opening to form a hollow inner surface 110 that terminates within the three-dimensional ceramic element 102. Sputtering techniques can be used to deposit a conductive coating on the outer surface 106 and the inner surface 110 of the ceramic heating device 100. A pair of electrodes 120, 122 and associated wiring 121, 123 from the voltage source can be soldered onto the conductive coating. The conductive material can be applied as a single layer or in multi-layers as either a thin film or thick film system. Both thin film and thick film systems provide an ohmic contact to the ceramic material. Thin film systems include, but are not limited to, three layer coating systems such as titanium, nickel-vanadium and silver layers or chromium-nickel-silver, nichrome and silver layers. Thick film systems include, but are not limited to, silver-zinc and aluminum layers separated by silver to provide solderable connections.

Figure 2:
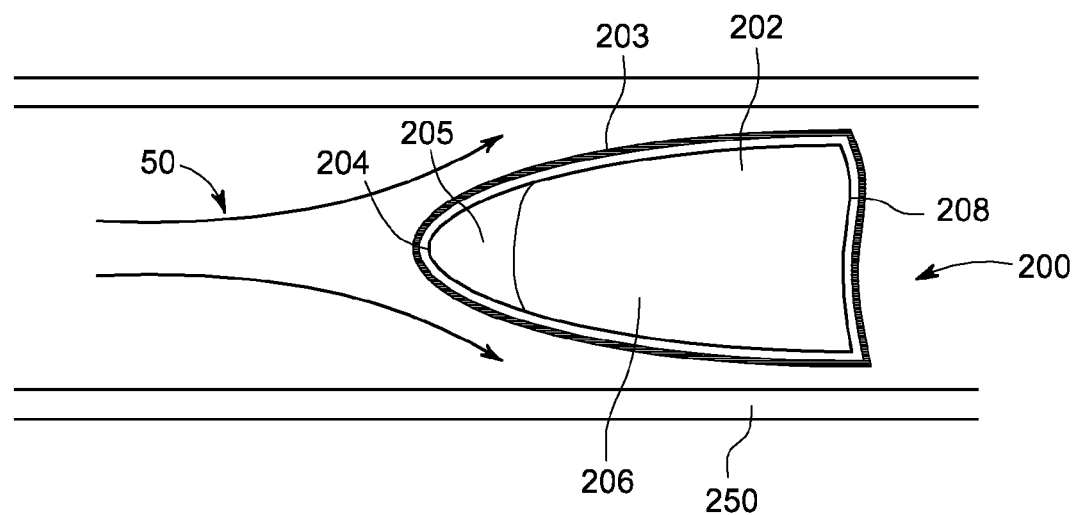
FIG. 2 is a cross-sectional view of another exemplary ceramic heating device proximate to a surface of an airspeed sensor.

FIG. 2 is a cross-sectional view of another exemplary ceramic heating device 200 proximate to a surface 250 of an airspeed sensor. In one embodiment, the ceramic heating device 200 can be positioned in the air flow 50 impinging upon the surface 250 that the heating device 200 is protecting from icing. The ceramic heating device 200 comprises a three-dimensional ceramic element 202. In one embodiment, the three-dimensional ceramic element 202 can have a housing 203 to protect the heating device 200 from abrasion.

The three-dimensional ceramic element 202 can have a tip 204 on a first end forming a tip section 205, and a base 208 on a second end, opposite of the first end. An outer surface 206 extends from the tip 204 to the base 208. In one embodiment, the outer surface 206 can have a conical shape, while in other embodiments, the outer surface 206 can have a different shape. For aircraft applications, the outer surface 206 would typically have an aerodynamic shape.

Figure 3:
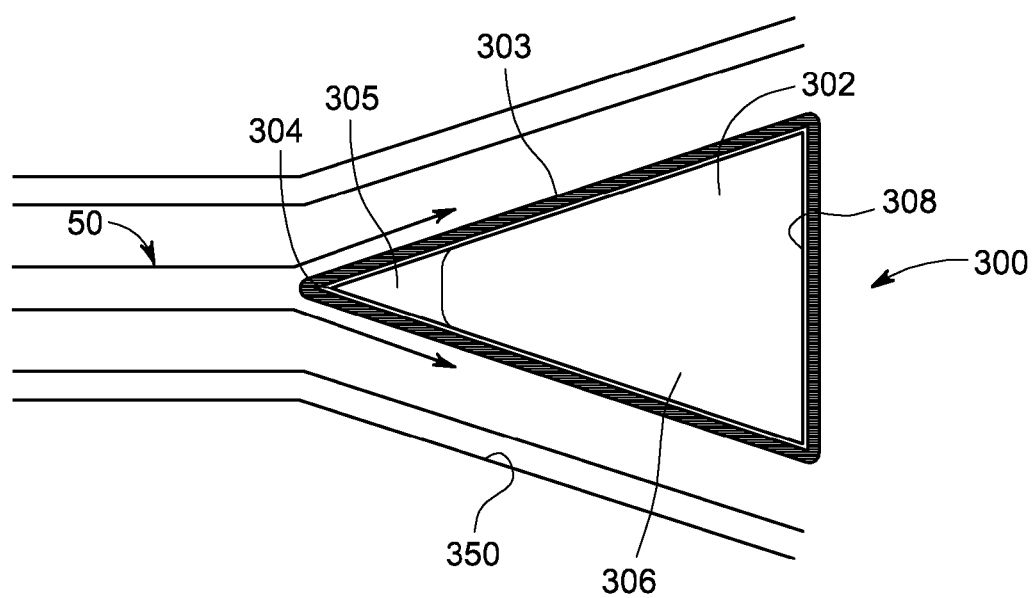
FIG. 3 is a cross-sectional view of yet another exemplary ceramic heating device proximate to a surface of an angle of attack sensor.

FIG. 3 is a cross-sectional view of yet another exemplary ceramic heating device 300 proximate to the surface 350 of an angle of attack sensor. In one embodiment, the ceramic heating device 300 can be positioned in the air flow 50 impinging upon the surface 350 that the heating device 300 is protecting from icing. The ceramic heating device 300 comprises a three-dimensional ceramic element 302. In one embodiment, the three-dimensional ceramic element 302 can have a housing 303 to protect the heating device 300 from abrasion.

The three-dimensional ceramic element 302 can have a tip 304 on a first end forming a tip section 305, and a base 308 on a second end, opposite of the first end. An outer surface 306 extends from the tip 304 to the base 308. In one embodiment, the outer surface 306 can have a triangular shape, while in other embodiments, the outer surface 306 can have a different shape. For aircraft applications, the outer surface 306 would typically have an aerodynamic shape.

Figure 4:
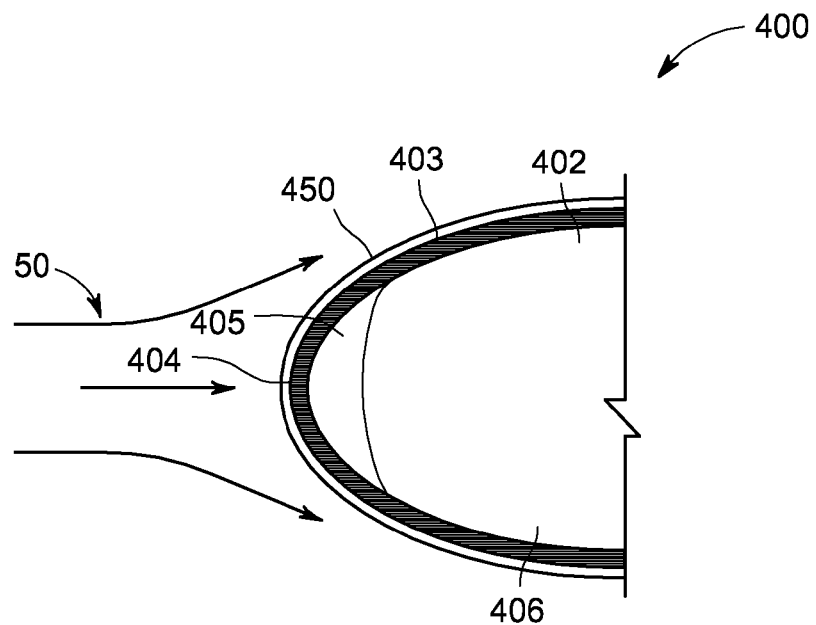
FIG. 4 is a cross-sectional view of still another exemplary ceramic heating device proximate to a surface of the fuselage of an aircraft.

FIG. 4 is a cross-sectional view of still another exemplary ceramic heating device 400 proximate to a surface 450 of the fuselage of an aircraft. In one embodiment, the ceramic heating device 400 can be positioned in the air flow 50 impinging upon the surface 450 that the heating device 400 is protecting from icing. The ceramic heating device 400 comprises a three-dimensional ceramic element 402. In one embodiment, the three-dimensional ceramic element 402 can have a housing 403 to protect the heating device 400 from abrasion.

The three-dimensional ceramic element 402 can have a tip 404 on a first end forming a tip section 405, and a base (not shown) on a second end, opposite of the first end. An outer surface 406 extends from the tip 404 to the base. In one embodiment, the outer surface 406 can have a rounded shape, while in other embodiments, the outer surface 406 can have a different shape. For aircraft applications, the outer surface 406 would typically have an aerodynamic shape.

Figure 5:
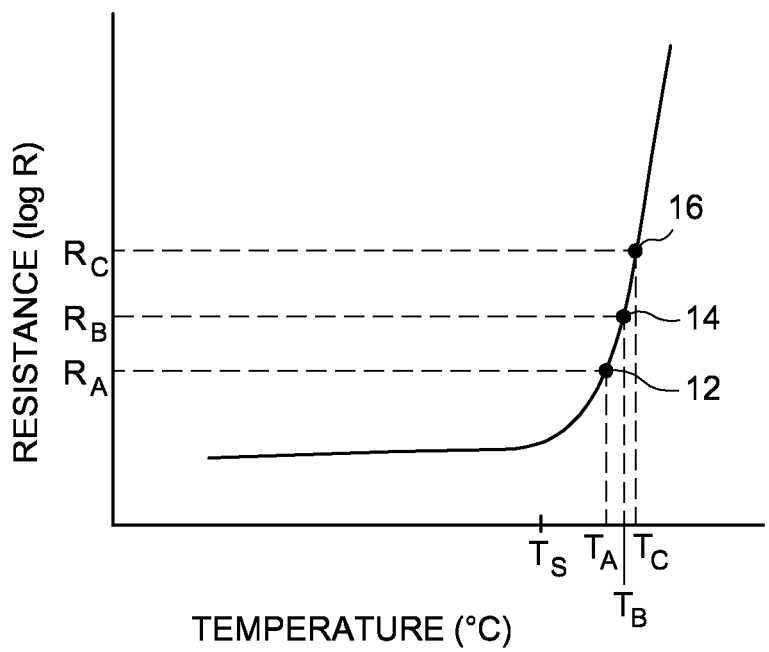
FIG. 5 is a plot of resistance versus temperature for a positive temperature coefficient ceramic heating device.
Figure 6:
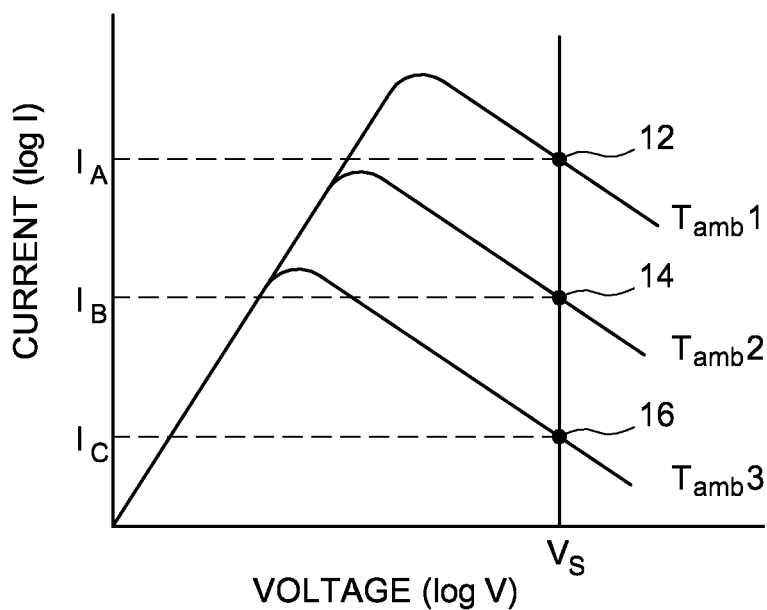
FIG. 6 is a plot of current versus voltage for a positive temperature coefficient ceramic heating device.

In one embodiment, the three-dimensional ceramic elements 102, 202, 302, 402 of the heating devices 100, 200, 300, 400 are made from positive temperature coefficient ceramic. FIG. 5 is a plot 10 of resistance versus temperature for a positive temperature coefficient ceramic heating device. FIG. 6 is a plot 50 of current versus voltage for a positive temperature coefficient ceramic heating device. As shown in the figures and as will be explained, positive temperature coefficient ceramic heating devices are self-regulating in operation in different ambient temperatures.

FIG. 5 illustrates that when the temperature of the positive temperature coefficient ceramic heating device is below a switching temperature (e.g., $T_S$=130° C.), the resistance of the heating device remains relatively constant. Above the switching temperature, the resistance of the heating device increases exponentially to limit the current through the heating device and reduce the temperature experienced by the heating device. By changing the composition of the positive temperature coefficient ceramic, the switching temperature can be adjusted to suit different applications.

Once the positive temperature coefficient ceramic reaches the switching temperature, small changes in temperature result in large changes in the resistance of the positive temperature coefficient ceramic. This allows the positive temperature coefficient ceramic to maintain a more consistent temperature through a wider range of ambient temperatures. For example, when a positive temperature coefficient ceramic heating device is experiencing higher temperature ambient conditions on a taxiway, once the heating device reaches a temperature greater than the switching temperature, the resistance in the heating device increases exponentially to limit the current under the same applied voltage.

Once manufactured as a three-dimensional heating device and electrically connected, the positive temperature coefficient ceramic will self-regulate to try to maintain the temperature of the heating device near the switching temperature. Since positive temperature coefficient ceramics are self-regulating, an advantage that may be realized in the practice of some embodiments of the described heating devices are the removal of failure prone components, such as thermostats, which increases the reliability of the heating device. The advantage of the positive temperature coefficient ceramic heater is that regardless of the range of ambient conditions, the device temperature will not vary significantly from the design temperature.

FIGS. 5 and 6 demonstrate how an exemplary positive temperature coefficient ceramic heating device can self regulate in varying ambient temperatures or combinations of ambient temperature and airspeed. FIG. 6 gives the idealized I/V characteristics for 3 ambient conditions $T_{amb}1$, $T_{amb}2$, $T_{amb}3$, where $T_{amb}1<T_{amb}2<T_{amb}3$. When driven by a constant voltage (Vs) the heating device has 3 operating currents, $I_A$, $I_B$, and $I_C$ where the temperature of the positive temperature coefficient ceramic is in thermal equilibrium with the surroundings. These equilibrium temperatures (12,14,16) are reflected on the resistance-temperature characteristic (FIG. 5) as operating points with resistances $R_A$, $R_B$ and $R_C$ and temperatures $T_A$, $T_B$ and $T_C$. As the R-T curve is very steep above the switching temperature ($T_S$) the difference in temperature between points TA and $T_C$ can be very small relative to the very large difference in positive temperature coefficient ceramic resistance ($R_A$ to $R_C$). Therefore, for a large change in ambient temperature, there is a very efficient regulation of power to maintain a close to constant device temperature. A low ambient temperature ($T_{amb}1$) is shown where the resistance of the positive temperature coefficient ceramic heating device is cooled to a value $R_A$ (temperature $T_A$) and the current increases to an equilibrium current level ($I_A$). This condition may be experienced during flight when extremely low ambient temperatures are experienced by the heating device. A high ambient temperature ($T_{amb}3$) is also shown where the resistance of the positive temperature coefficient ceramic heating device is heated to a value $R_C$ (temperature $T_C$) and the current decreases to an equilibrium current level ($I_C$). This condition may be experienced on a taxiway when relatively higher ambient temperatures are experienced by the heating device.

An example of the above conditions can be seen in a positive temperature coefficient ceramic heated angle of attack sensor where the intrinsic self regulation range of power is from about 20 W while the aircraft is static on the ground, having an ambient temperature of about +70° C., to about 230 W while the aircraft is in flight having a speed of about mach 0.9, and an ambient temperature of about −60° C.

Another advantage of the self-regulating properties of the positive temperature coefficient ceramic heating device is that the different portions of the three-dimensional ceramic element 102, 202, 302, 402 can receive extra current and heat generated in the area of the heating device (e.g., the tip section 105, 205, 305, 405) where there is additional heat dissipation with increased airflow during flight. For example, since the tip sections 105, 205, 305, 405 may operate at a lower temperature than sections near the base 108, 208, 308 of the ceramic element 102, 202, 302, 402, the tip section will have a lower resistance and higher current to provide higher levels of heating.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural heating devices that do not differ from the literal language of the claims, or if they include equivalent structural heating devices with insubstantial differences from the literal language of the claims.

What is claimed is:

1. A heating device comprising a ceramic element, wherein the ceramic element comprises a tip on a first end; a base on a second end opposite of the first end; and an outer surface extending from the tip to the base and defining a non-planar three-dimensional shape; and an opening proximate to the base, the opening terminating within the ceramic element defining a hollow inner surface of the ceramic element.

2. The heating device of claim 1, wherein the ceramic element is a positive temperature coefficient ceramic.

3. The heating device of claim 1, further comprising a housing shaped to conform with the outer surface of the ceramic element.

4. The heating device of claim 1, further comprising a protective coating on the outer surface of the ceramic element to protect the ceramic element from abrasion.

5. The heating device of claim 1, wherein the outer surface of the ceramic element is a generally conical shape.

6. The heating device of claim 1, further comprising a conductive coating sputtered onto the ceramic element.

7. The heating device of claim 6, wherein the conductive coating comprises titanium.

8. The heating device of claim 7, wherein the conductive coating further comprises silver and a nickel-vanadium alloy.

9. The heating device of claim 1, further comprising a first electrode and second electrode attached to the ceramic element.

10. The heating device of claim 9, wherein the first electrode is attached to the outer surface of the ceramic element and the second electrode is attached to the hollow inner surface of the ceramic element.

11. The heating device of claim 10, wherein the first electrode and the second electrode are soldered connections.

12. The heating device of claim 1, wherein the ceramic element is proximate to a surface of a sensor.

13. The heating device of claim 12, wherein the sensor is a pitot tube air speed sensor.

14. The heating device of claim 12, wherein the sensor is an angle of attack sensor.

15. The heating device of claim 1, wherein the outer surface of the ceramic element comprises: a length in a first plane having an axis parallel to the first plane; and a diameter in a second plane having an axis orthogonal to the first plane, wherein the diameter varies along the length from the tip to the base.

16. A heating device comprising: a ceramic element, wherein the ceramic element comprises a tip on a first end, a base on a second end opposite of the first end, and an outer surface extending from the tip to the base and defining a non-planar three-dimensional shape; an opening proximate to the base, the opening terminating within the ceramic element defining a hollow inner surface of the ceramic element; a first electrode attached to the outer surface of the ceramic element; a second electrode attached to the hollow inner surface of the ceramic element; and a sensor disposed proximate to the outer surface of the ceramic element.

17. The heating device of claim 16, further comprising a housing shaped to conform with the shape of the outer surface of the ceramic element.

18. The heating device of claim 16, further comprising a protective coating on the outer surface to protect the ceramic element from abrasion.

19. The heating device of claim 16, wherein the ceramic element is a positive temperature coefficient ceramic.

\* \* \* \* \*